United States Patent [19]
Paul et al.

[11] Patent Number: 5,362,219
[45] Date of Patent: Nov. 8, 1994

[54] INTERNAL COMBUSTION ENGINE WITH COMPOUND AIR COMPRESSION

[76] Inventors: Marius A. Paul; Ana Paul, both of 969 La Pax, Placentia, Calif. 92670

[21] Appl. No.: 775,778

[22] Filed: Oct. 11, 1991

Related U.S. Application Data

[63] Continuation-in-part of Ser. No. 428,853, Oct. 30, 1989, Pat. No. 5,056,314.

[51] Int. Cl.$^5$ .................. F04C 18/22; F04C 29/08; F16K 21/10
[52] U.S. Cl. .................. 418/61.2; 137/514.7; 418/159
[58] Field of Search .................. 418/61.2, 159; 137/514.7

[56] References Cited

U.S. PATENT DOCUMENTS

| | | | |
|---|---|---|---|
| 2,644,481 | 7/1953 | Perlman | 137/514.7 |
| 2,991,930 | 7/1961 | Lindner. | |
| 3,446,190 | 5/1969 | Bensinger et al. | |
| 3,628,899 | 12/1971 | George | 418/61.2 |
| 3,762,376 | 10/1973 | Eberle et al. | 123/242 |
| 3,844,256 | 10/1974 | Ishikawa et al. | |
| 3,883,273 | 5/1975 | King | 418/61.2 |
| 3,886,911 | 6/1975 | Glatt. | |
| 4,389,172 | 6/1983 | Griffith | 418/61.2 |
| 4,410,299 | 10/1983 | Shimoyama | 418/61.2 X |
| 4,502,283 | 3/1985 | Wandel | 60/609 |
| 4,603,710 | 8/1986 | Tiefenthaler | 137/514.7 |
| 4,656,992 | 4/1987 | Oonaka et al. | 123/564 X |
| 4,964,275 | 10/1990 | Paul et al. | 60/605.1 |
| 5,056,314 | 10/1991 | Paul et al. | 60/609 |
| 5,165,238 | 11/1992 | Paul et al. | 60/682 |
| 5,168,846 | 12/1992 | Paul et al. | 418/159 X |

FOREIGN PATENT DOCUMENTS 3888 6/1916 United Kingdom ............. 418/159

*Primary Examiner*—Michael Koczo
*Attorney, Agent, or Firm*—Bielen, Peterson & Lampe

[57] ABSTRACT

A rotary air compressor with a housing forming an epitrochoidal chamber in which a multilobed rotor with a ring gear eccentrically rotates on an internal central gear in the housing, the rotor dividing the chamber into multiple subchambers of changing volume as the rotor rotates, the chamber having intake ports of variable size opening to change the quantity of gas that is compressible and outlet ports having spring biased plunger valves to prevent flow of discharged compressed air back into the compressor.

4 Claims, 6 Drawing Sheets

INTERNAL COMBUSTION ENGINE WITH COMPOUND AIR COMPRESSION

This application is a continuation-in-part of our co-pending application, Ser. No. 428,853, filed Oct. 30, 1989 of the same title, now U.S. Pat. No. 5,056,314.

BACKGROUND OF THE INVENTION

This invention relates to an internal combustion engine in which the engine is supercharged by both a rotary blower and a turbocharger wherein the rotary blower comprises a Wankel-type compressor.

In prior art engines various combinations of precharging devices have been proposed to compress air delivered to internal combustion engines of the reciprocal piston type. The most common charging system is a turbocharger which charges the engine using a centrifugal compressor driven by a turbine that is powered by exhaust gases.

In a more complex system applicants have proposed using both a turbocharger and a positive displacement rotary expander/compressor, which like the turbocharger has one side of the unit driven by the exhaust gases and the other side operated as a compressor.

The unique combination of the turbocharger and the rotary compressor/expander was considered to comprise the best combination of the turbocharger and a Wankel-type unit. However, unexpected results were obtained when both sides of the rotary Wankel-type unit were used as a compressor and driven by power from the engine shaft.

At lower speeds of operation, the turbocharger delivers no compression and all of the compression is provided by the rotary compressor operating as a blower. At mid-range speeds both the turbocharger and the rotary compressor contribute and develop an enormous compression. At high speeds, the turbocharger develops sufficient compressed air to not only power the engine, but drive the rotary compressor which operates as an air motor.

The requirement for a "waste gate" which allows exhaust gases to bypass the turbine to prevent over-rotation of the turbocompressor unit is eliminated. The once lost power is now recaptured by driving the rotary compressor connected to the engine shaft, adding mechanical energy through the engine shaft to the engine.

In effect, the combination system proposed is its own self regulator and is a substantial improvement over existing systems such as the engines utilizing a Roots-type blower or the hyperbar engine utilizing a gas turbine engine in combination with a reciprocal engine. The invented engine responds to operating conditions with sufficient quantities of air and avoids the lag encountered on use of a conventional turbocharger or an air supply at high power cost encountered with most conventional blowers.

SUMMARY OF THE INVENTION

This invention relates to an internal combustion engine having a supercharging system that combines a conventional type turbocharger in series with a Wankel-type, positive displacement compressor. The turbocharger having a turbine and a connected compressor, driven by exhaust gases from the engine supplies air to the positive displacement rotary compressor, further compresses the air and delivers highly compressed air to the primary engine component. The rotary compressor is connected to the shaft of the engine component to allow the rotary compressor to compress air at low speeds when the turbocharger is effectively non-functional. While such operation was expected, the extraordinary level of compression was surprising with an overabundance of air to provide smokeless operation at the lowest speeds. The engine component to which the supercharging system is coupled can either be of a reciprocal or a rotary type. An improved construction of the Wankel-type, three-lobe, epitrochoidal/compressor is disclosed with an adjustable intake, utilizing design features described in our U.S. patent application, Ser. No. 715,411, filed Jun. 14, 1991, entitled, "Rotary Engine with Variable Displacement," U.S. Pat. No. 5,168,846, and an automatically operable exit valve described herein.

What was wholly unexpected upon the coupling was the extremely high torque performance at mid and upper ranges of operation. In the low to mid speed ranges, the turbocompressor becomes functional due to sufficient exhaust gases to drive the turbine and hence the attached centrifugal compressor. The compressed air helps drive the rotary compressor, which further compresses the air. At a certain point at higher speed operation, the rotary compressor extracts no energy from the drive shaft and is driven by the compressed air from the turbocompressor. Finally, at peak performance operation, the large quantity of high-pressure exhaust gases drives the turbocompressor and the excess energy that is normally vented is used to compress air that drives the rotary compressor to an extent that energy is returned through the mechanical connection of the rotary compressor with the drive shaft of the primary engine component. An unprecedented power density is therefore achieved by the engine at the output drive shaft through the combination of the operation of the internal combustion engine component and the rotary compressor acting as an air motor. Low emission levels are achieved by the overabundance of air at all levels of rotations and loads.

DESCRIPTION OF THE PREFERRED EMBODIMENTS

Figure 1:
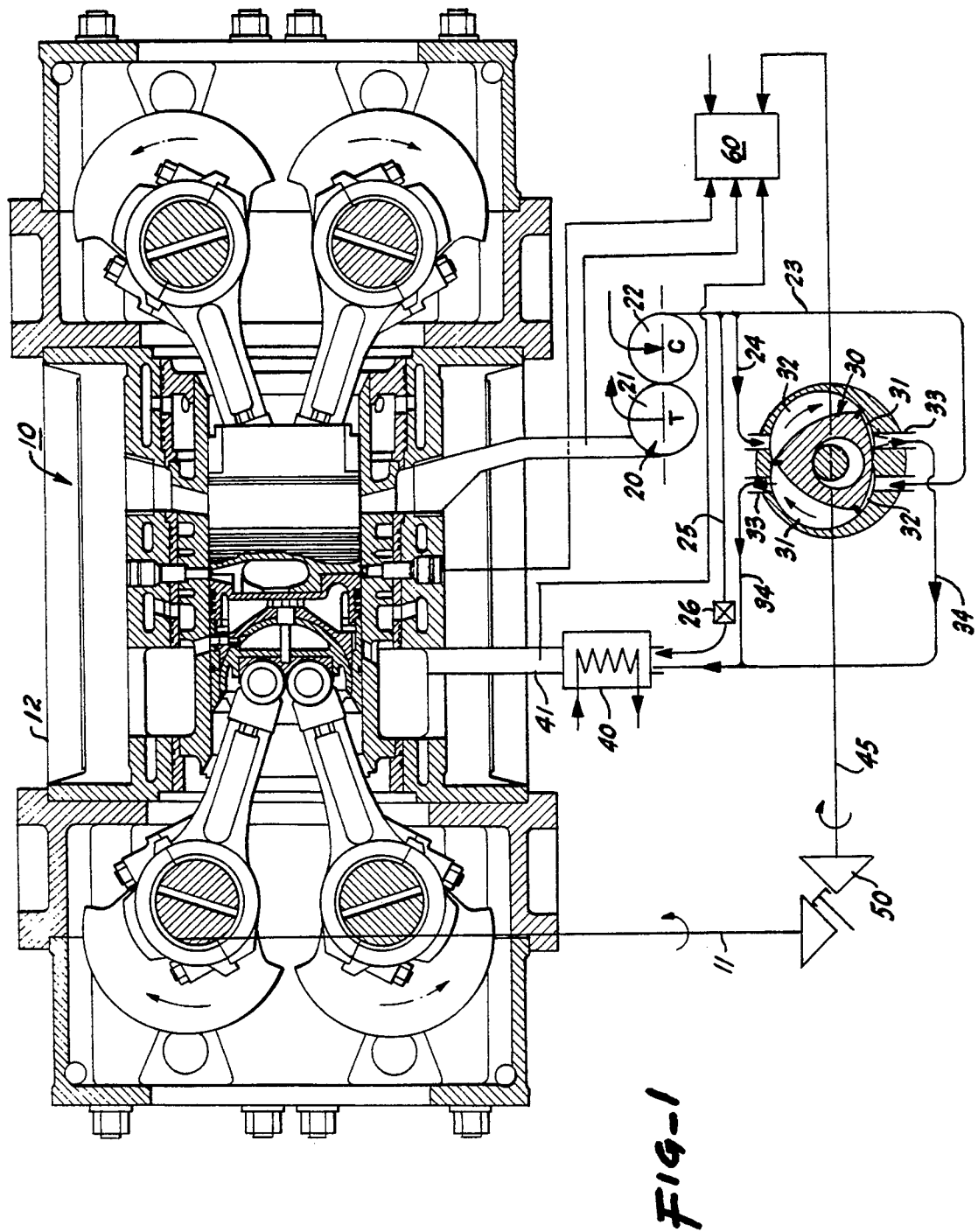
FIG. 1 is a cross sectional view of an opposed piston reciprocator with the turbocompressor and rotary compressor/air motor.

Referring to FIG. 1 the high pressure reciprocal engine 10 is shown with a reciprocator component 12 having a drive shaft 11, a conventional-type turbocharger 20, having a gas turbine 21 and coupled turbocompressor 22, and a Wankel-type, three-lobe, epitrochoidal, rotary compressor 30. The rotary compressor 30, more accurately a rotary compressor/air motor 30, has compressor sides 31 and expander sides 32 and has a drive shaft 45 that is mechanically connected to the drive shaft 11 of the reciprocator component 12 by a continuously variable transmission 50. Compressed air from the rotary compressor 30 is supplied to the reciprocator component 12 through an intercooler 40 to increase the air density to the reciprocator component 12. The reciprocator component 12 is of the preferred type described in my patent U.S. Pat. No. 4,809,646, issued Mar. 7, 1989, entitled, High Pressure Reciprocator.

The air connection from the turbocharger 20 is connected through air conduits 23 and 24 to the rotary expander sides 32 of the rotary compressor. The air is further compressed in the rotary compressor and delivered from the rotary compressor sides 31 of the compressor through valves 33 and air conduits 34 to the intercooler 40. After passing through the intercooler 40 the compressed and cooled air is delivered to the engine through air conduit 41.

For flexibility of operation, the rotary compressor can be bypassed by direct supply of compressed air from the turbocharger through air conduit 25 with valve 26, which is controlled by microprocessor 60 for partial or complete bypass. Microprocessor 60 includes sensors to optimize the operation of the engine according to speed, load, torque demand and other conventional input. While direct mechanical connection of the rotary compressor and fixed operation of the turbocharger compression through the rotary compressor provides extraordinary improvement of operation, the microprocessor allows refined control not only of performance, but of emissions.

In operation the engine goes through three general operating phases. First, at greater than fifty percent load, $Pc = Pt + \Delta pv + \Delta pp = PAB$ where zero mechanical work is required for compression. Second, at full power $Pc > Pt + \Delta pv + \Delta pp = PAB$ where compound positive mechanical work is transferred to the crankshaft. Third, at part load $PAB = Pt + \Delta pv + \Delta pp > Pc$ where negative mechanical compounding and work is absorbed from the crankshaft.

In the preceding expression $Pc$ is the air pressure delivered to the rotary compressor, $Pt$ is the pressure delivered to the turbine, $\Delta pv$ is the pressure drop from the engine component through the valves to the turbine, $\Delta pp$ is the pressure drop from the rotary compressor to the air box, i.e. the intake ports of the combustion chamber of the engine components, and $PAB$ is the air box pressure.

Figure 2:
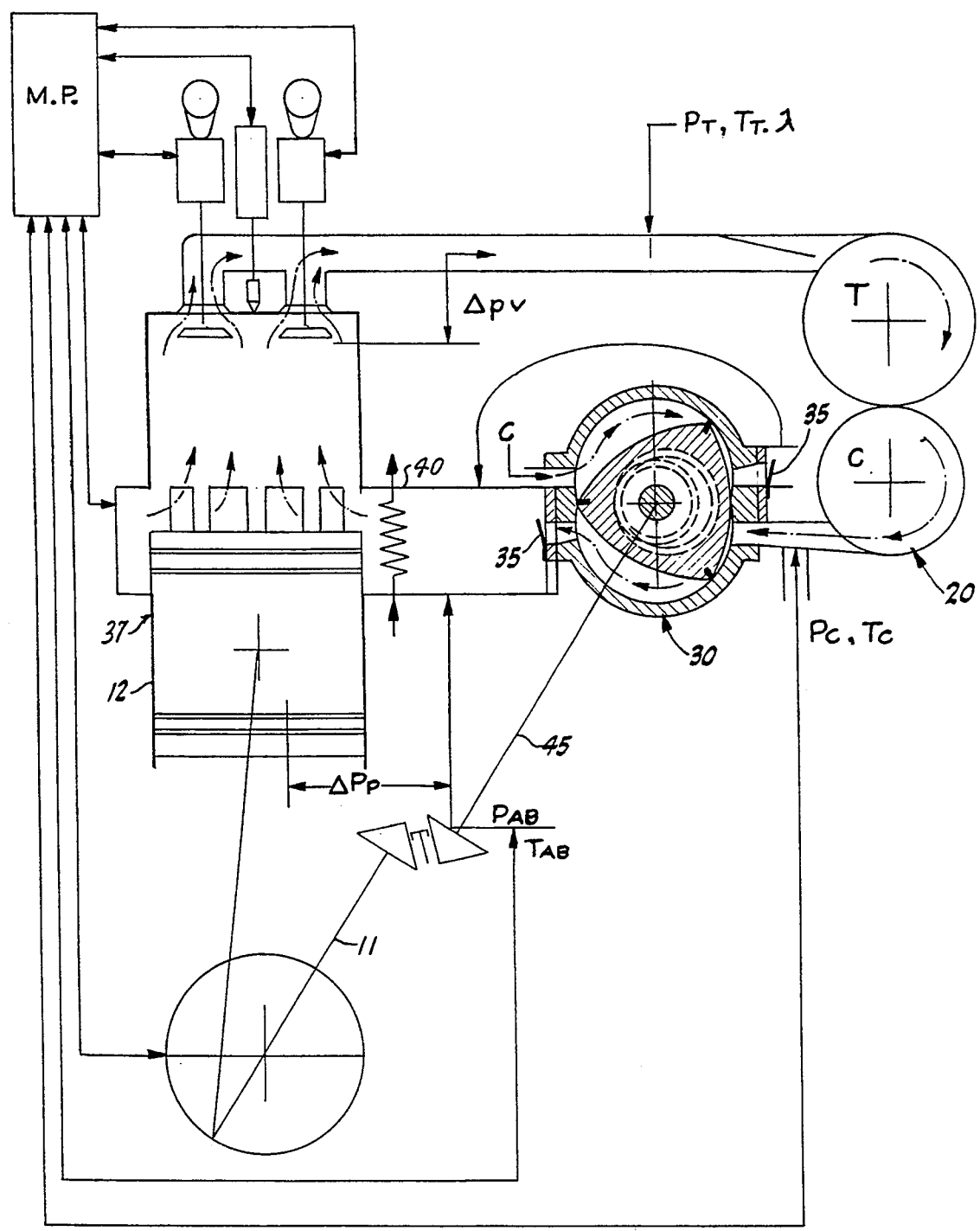
FIG. 2 is a schematic illustration of a conventional reciprocator with the turbocompressor and rotary compressor/air motor.

Referring now to FIG. 2, a similar solution is provided for a conventional reciprocator component 37 connected mechanically to a Wankel-type, three-lobe, epitrochoidal, compressor 30 and turbocharger 20. The rotary compressor/air motor 30 is directly connected to an intercooler 40 through flap valves 35. The operation is similar to that described with reference to the embodiment of FIG. 1.

Figure 3:
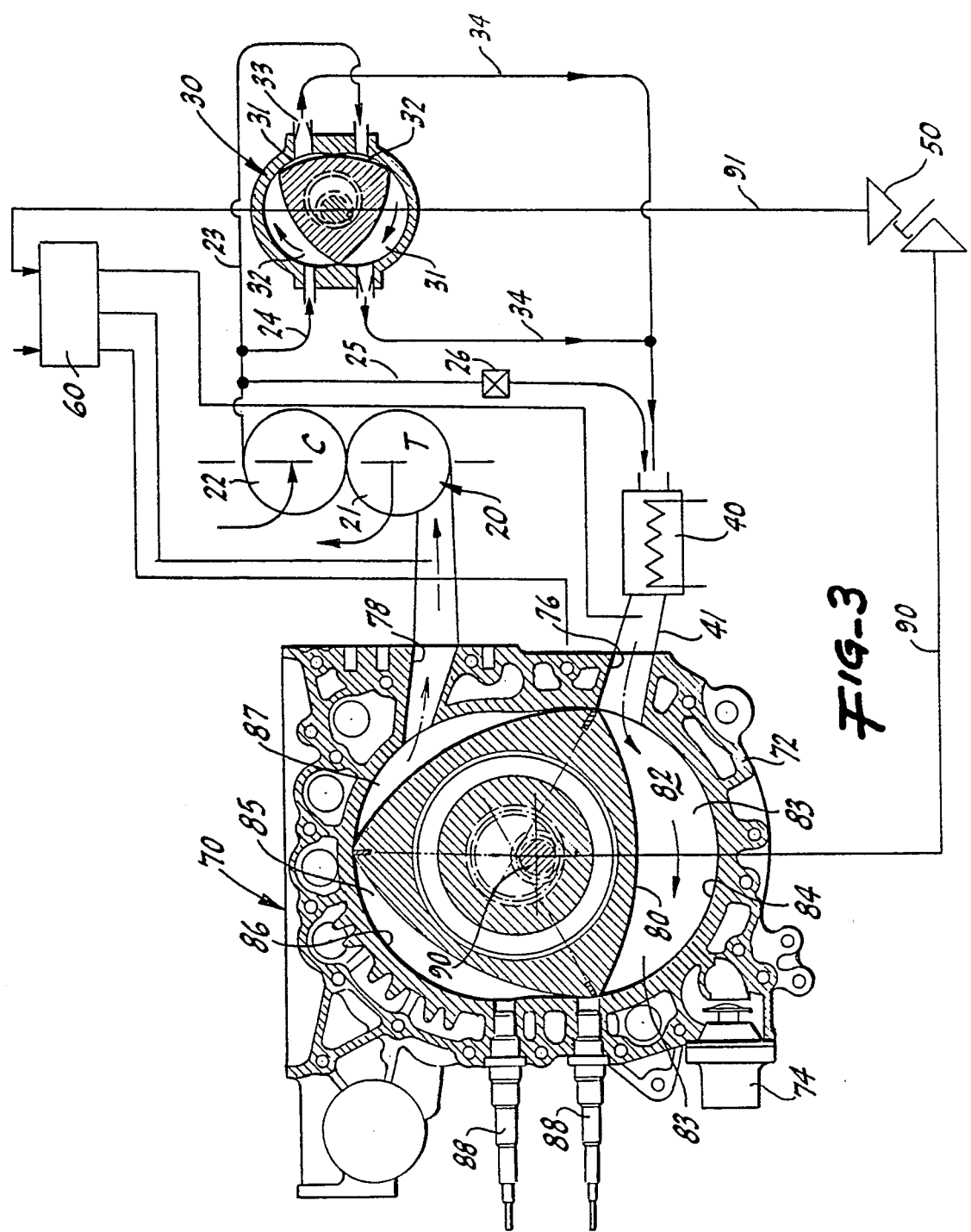
FIG. 3 is a schematic illustration of a rotary (Wankel) engine, with the turbocompressor and rotary compressor/air motor.

Referring now to FIG. 3, a similar solution is provided for a rotary, three-lobe, epitrochoidal, Wankel-type engine component 70 connected mechanically to a Wankel-type, three-lobe, epitrochoidal, rotary compressor/air motor 30 and turbocharger 20. The components of the rotary compressor/air motor are the same as described with reference to FIG. 1. The rotary compressor/air motor 30 is directly connected to the intercooler 40 through flap valve 35. The operation is similar to that described with reference to the embodiment of FIG. 1. The rotary Wankel-type engine component 70 is of conventional construction with a housing 72, including any necessary cooling system 74, air intake 76, that connects via conduit 41 to the compressor/air motor 30, and an exhaust exit 78 that connects to the turbine 21 of the turbocharger 22. The Wankel-type engine component 70 has a rotor 80 in a chamber 82 having an air compression side 84 and a combustion expansion side 86. The rotor 80 rotating in the housing 72 divides the chamber 82 into subchambers 83, 85, and 87 for compressing and expanding gases in the engine component. Injectors 88 inject fuel ignited by tandem spark plugs into the expansion side for powering the engine through shaft 90 which is coupled to the drive shaft 91 of the compressor/air motor 30 through variable transmission 50. Alternately, the improved design of the Wankel-type engine component as described in the referenced application, Ser. No. 715,441, can be substituted for the conventional design shown.

In a test with a 353 Detroit Diesel engine rated at 70 hp. natural aspiration, and 115 hp. turbocharged, approximately 212 hp. was developed without increased fuel consumption with the compound compression system of this invention. The engine was a three cylinder, two-cycle reciprocal engine with 53 cu. in./cylinder. The rotary compressor had three lobes and displaced 16.8 liters of air on each rotation. The rotary compressor was connected to the reciprocator on a 3:1 reduction with three rotations of the engine to each rotation the rotary compressor. The turbocharger provided a compression of 4.7 atm. at optimum operation and delivered compressed air between 800 and 2200 r.p.m. of engine speeds. When reaching 80–90% of optimum operation the turbocharger began driving the rotary compressor and returning power to the engine shaft by the air motor action of the rotary compressor.

Throughout the operating range of the engine, excess air was generated and emissions minimized.

Figure 4:
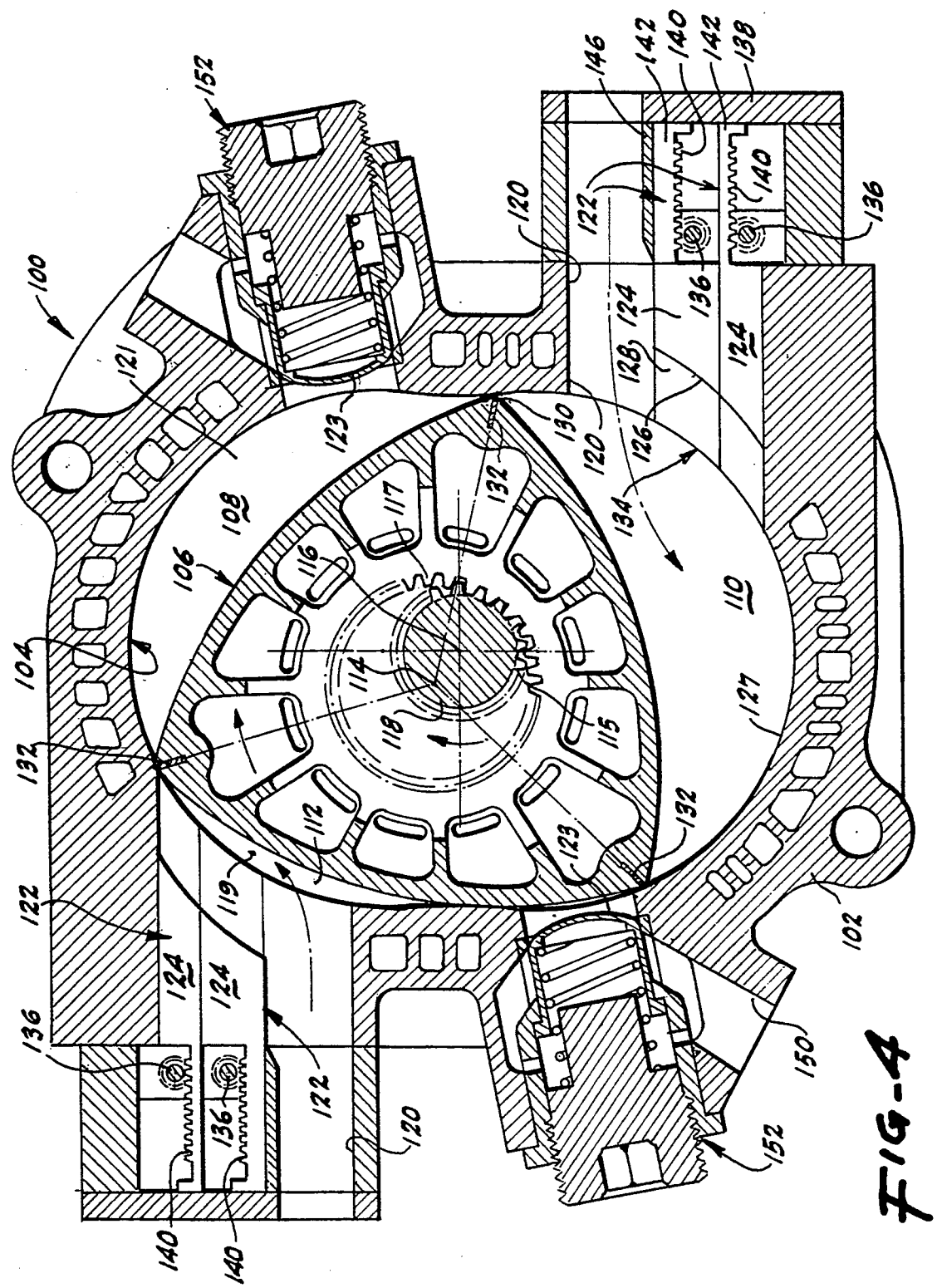
FIG. 4 is a cross sectional view of an improved rotary compressor that is operable in the schematic of FIG. 3.
Figure 5:
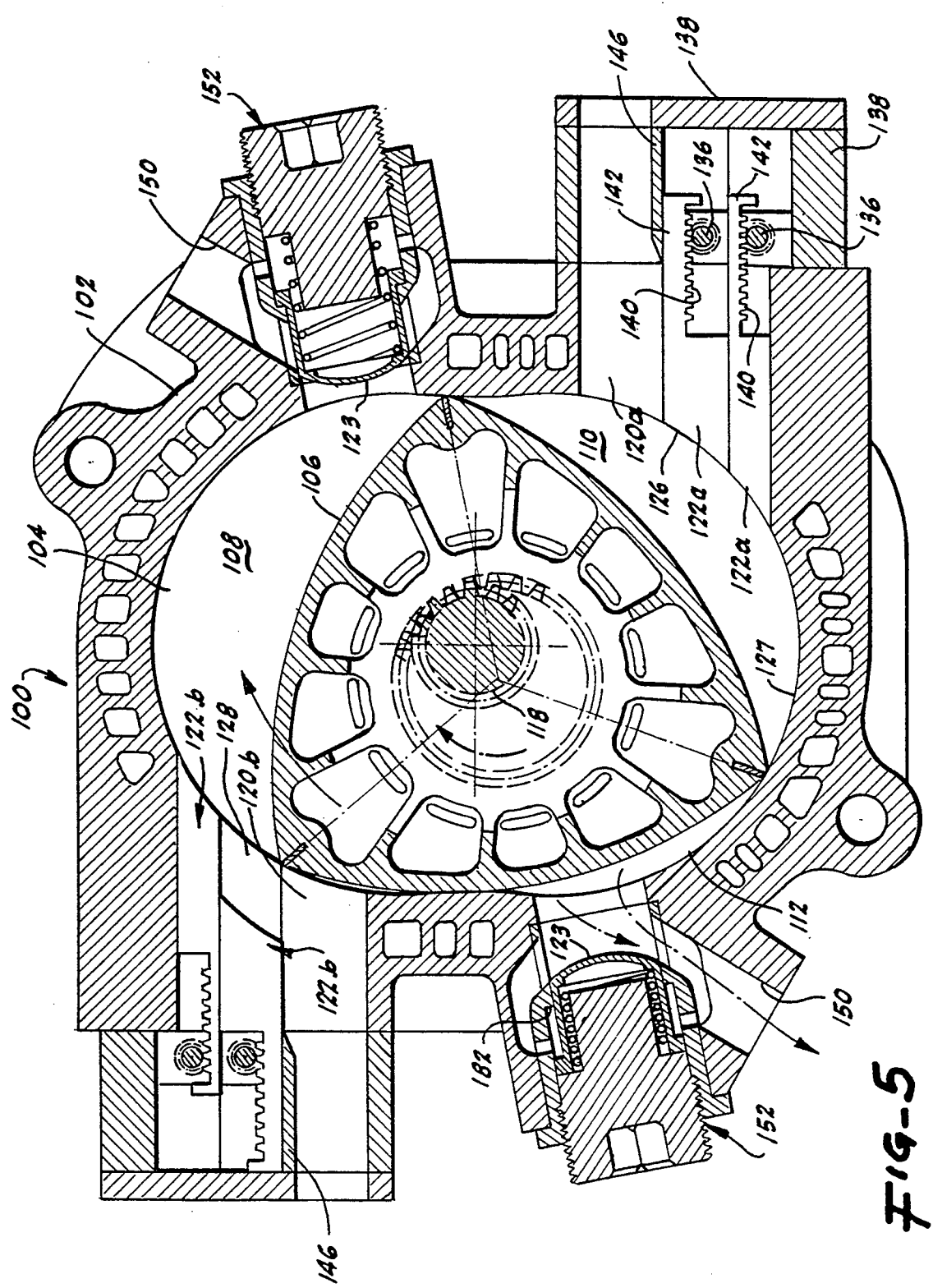
FIG. 5 is a cross sectional view of the compressor of FIG. 4 with the rotor in an advanced position.
Figure 6:
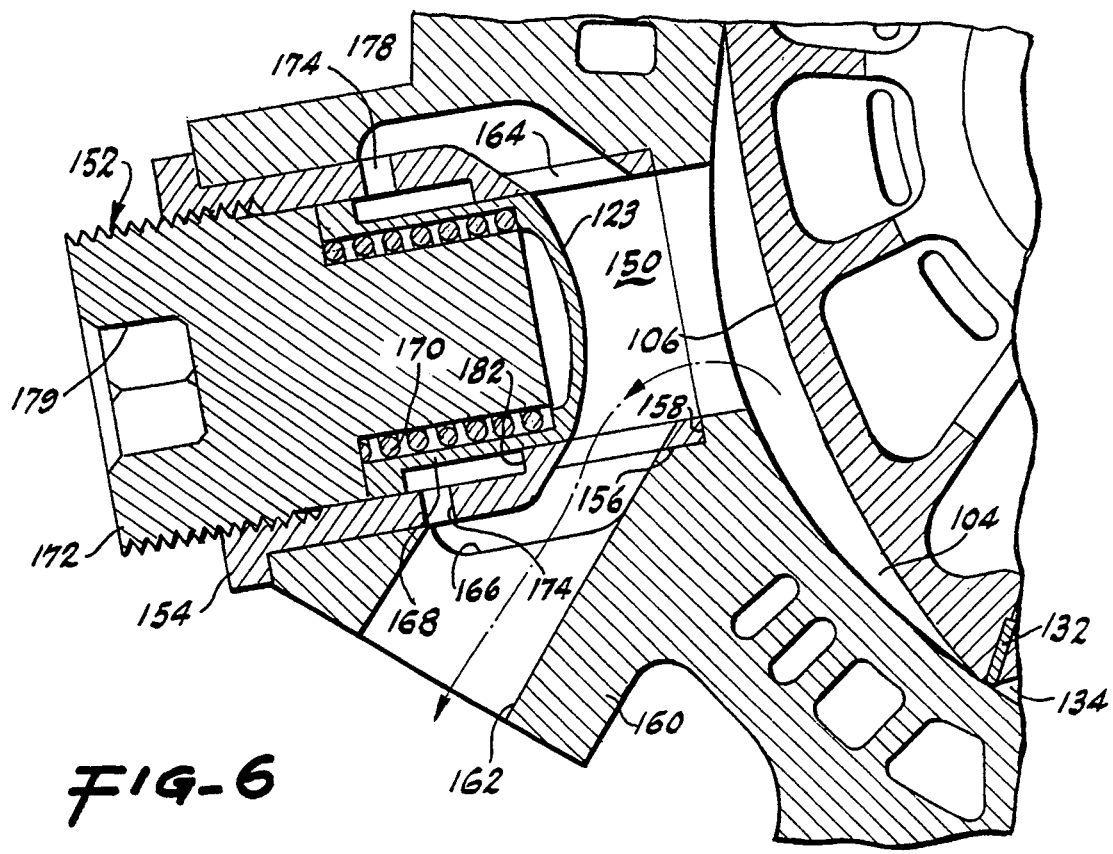
FIG. 6 is an enlarged cross sectional view of the exit valve for the compressor of FIG. 5.

The rotary compressor/air motor 30 is either of conventional design as schematically illustrated in FIGS. 1–3, or of the improved construction as shown in FIGS. 4–6. In FIGS. 4 and 5 a Wankel-type, three-lobe, epitrochoidal, rotary compressor 100 is shown. The compressor 100 is installable in the schematic circuit of FIGS. 1–3 as a substitute for the conventional compressor 30 shown therein schematically. The improved rotary compressor 100 includes a housing 102 having a chamber 104 with a three-lobe rotor 106 dividing the chamber 104 into three compression subchambers 108, 110, 112 of changing volume. The rotor 106 has a central axis 114 eccentric to its drive shaft 118 and to the effective center axis 116 of the epitrochoidal chamber 104. The rotor 106 has an internal ring gear 115 and eccentrically rotates around the chamber on a circular external gear 117 fixed to the housing 102 and concentric with the drive shaft when driven by the drive shaft 118 of the compressor 100, or when rotating the shaft 118 when operating as an air motor as previously described.

As illustrated in FIG. 4, both halves of the compressor 100 are involved in compression with each half having an expander side 119 with an air intake port 120 and compression side 121 having an automatic valve 123. The intake port has means for adjusting the volume of intake gas compressed. The means for varying the effective displacement of the compressor comprises one or more slide valves 122 (here preferably two) for each intake port 120. The slide valves 122 each have a slide block 124 with an end portion 126 that conforms to the interior configuration of the perimeter interior wall 127 of the housing chamber 104 when the block is extended as shown in FIG. 5. The blocks 124 are rectangular in cross section and are positioned in recesses 128 such that the end portions span the central part of the width of the chamber 104 without interfering with the corners of the apex end seals 132. On full retraction, as shown in FIG. 4, the rotor apex 130 must sweep past the expanded opening 134 of the intake port before the rotor end seals 132 seal the subchamber 110 and the rotor commences compression. As shown in FIG. 5, for purposes of illustration, one of the intake ports 120a has valves 122a fully extended for maximum volume compression, and one of the intake ports 120b has valves 122b divided, with one extended and one retracted for midrange compression. Normally, both intake ports have slide valves positioned in a similar manner if the air or gas compressed is delivered to a common destination.

The displacement of the valves is accomplished by a pinion 136 in a valve cover 138 that forms part of the housing 102. The pinion 136 engages a rack 140 in the back portion 142 of the valve slide block 124. The slide blocks 124 are back to back and retained in the recesses 128 in the compressor housing 102 with the back portion 142 sealed from the intake port 120 by a divider 146. The pinion 136 is connected to a conventional electronic control (not shown) to rotate the pinion and displace each slide block as required in response to air capacity demands. The slide blocks can, if desired, be controlled for operation between any of the positions shown, where finer throttling of the compressed air delivery is needed.

Figure 7:
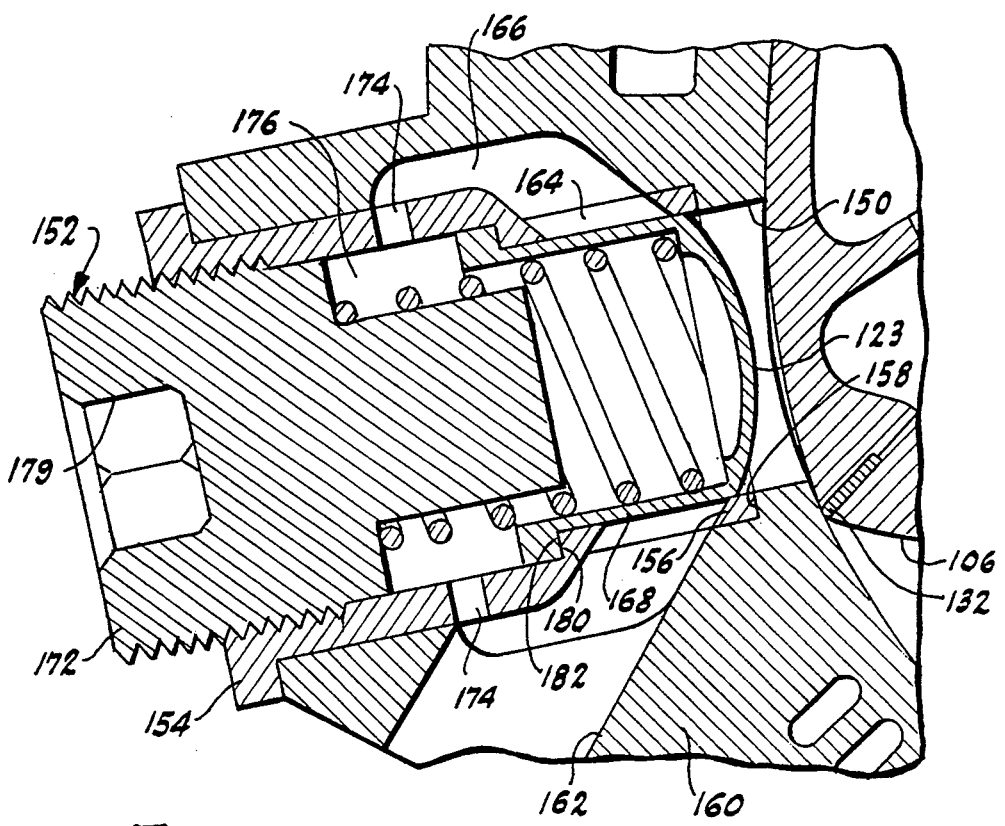
FIG. 7 is an enlarged cross sectional view of the exit valve of FIG. 6 in a different operating position.

Once the apex 130 of the rotor passes the combined opening of an intake port 120, the rotor 106 begins compressing the volume of air, as shown for the compression subchamber 108, FIG. 4. The outlet port 150 is protected by a spring biased plunger valve 152. The plunger valve 152, also shown in the enlarged views of FIG. 6 and 7, has a guide sleeve 154 that has a distal end 156 that seats in a groove 158 in outlet port housing 160. The outlet port 150 has a discharge end 162 that connects to the component receiving the compressed gas such as the conduit 34 to the intercooler 40 and engine component 70 of FIG. 3. The guide sleeve 154 has a series of perimeter ports 164 that communicate with an annular cavity 166 to allow full flow-through of compressed gases to the discharge end 162 of the outlet port 150. The guide sleeve 154 provides a cylinder guide for a slide piston 168, which is biased by a compression spring 170 toward the housing chamber 104, blocking the perimeter ports 164. The compression spring 170 is seated on a plug 172 which is threaded into the end of the guide sleeve 154. The plug provides a fine adjustment means to regulate the differential chamber pressure required to displace the slide piston 168 against the conduit back pressure and expose the exit passage through the perimeter ports 164. The guide sleeve 154 has strategically positioned relief orifices 174 which provide a passage to the chamber 176 behind the slide piston 168, when extended, as shown in FIG. 7, or to an annular buffer space 178, when retracted by force of the gas pressure in the housing chamber 104, as shown in FIG. 6.

In the former extended position, the orifices 174 allow communication with the discharge end 162 of the outlet port 150 such that the back pressure of delivered compressed gas urges the slide piston 168 to the closed position. In this manner, the plunger valve 152 operates as a differential valve with the pressure differential between the two sides of the valve necessary to open the valve being determined or regulated by the spring constant and setting of the compression spring 170. The setting of the compression spring 170 is adjusted by displacement of the plug 172 by engaging an Allen-type wrench in the hex recess 179 to the plug and screwing the plug into or out of the guide sleeve 154.

In the latter retracted position, where the lip 180 of the slide piston 168 has displaced past the orifices 174 as shown in FIG. 6, a volume of compressed gas is trapped in the buffer space 178 as the slide piston 168 returns to its port blocking position when compression has been completed. The trapped gas provides a damping means for the slide piston which otherwise would suffer the full force of the compression spring and compressed-gas, back pressure as the rotor sweeps passed the compression phase and into the suction or intake phase as shown for the subchambers 112 and 110 in FIG. 4. The trapped gas bleeds around the lip 180 of the slide piston 168 allowing the lip 180 to seat in a cushioned manner on the stop lip 182 of the guide sleeve in the advanced position of the slide piston 168.

The plunger valve automatically opens when the desired threshold pressure is reached and automatically closes when the compression phase has been completed.

The operation of the compressor can be readily understood by considering the rotor movement as shown in FIGS. 4 and 5. The subchamber 108 in FIG. 5 is nearing completion of the intake where gases have expanded into the subchamber and are substantially at the pressure of the gas delivery source, which, for example, may be atmospheric pressure or turbocharged pressure depending on the setup. As shown in FIG. 4 for subchamber 108, the subchamber is sealed and positive displacement compression has commenced. The compression is not yet sufficient to displace the slide piston 168 of the plunger valve 152. However, as the volume of the subchamber decreases and the pressure increases and overcomes both the back pressure from previously delivered gas and the spring force of the plunger valve, the slide piston retracts as shown for subchamber 112 in FIG. 5, releasing the compressed gas through the open outlet port 150. Once the subchamber reaches its minimum volume, the rotor moves to expose the intake port 120 to admit the gas to be compressed as shown in the subchamber 112 of FIG. 4. As the rotor 106 continues its rotation, the volume of the subchamber increases as shown for subchamber 110 in FIGS. 5 and 4, respectfully.

As appreciated, a maximum volume and charge of gas would be obtained with the rotor in the position as shown in FIG. 5 for subchamber 108, but with both slide valves 122b extended. A minimum volume and charge would occur with the rotor in the position as shown in FIG. 4 for subchamber 108 with both slide valves 122 retracted as depicted.

Although the compressor was designed for use as a supercharging device for an internal combustion engine, it is apparent that the device has independent ability wherever a gas is desired to be compressed.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A rotary compressor comprising:

a housing forming an epitrochoidal chamber having a central axis with the housing having a circular external gear concentric to the central axis;

a multilobed rotor having an internal ring gear, the rotor eccentrically rotatable in the housing;

a drive shaft connected to the rotor for eccentrically rotating the rotor in the epitrochoidal chamber with the ring gear of the rotor engaging the circular gear of the housing, wherein the rotor divides the chamber into multiple subchambers for compression of gas as the rotor rotates; and, at least one gas intake port having an opening to the chamber and at least one gas outlet port for gas discharge from the compressor, wherein the intake port has at least one slide block means for expanding the opening of the intake port to the chamber and reducing the quantity of gas compressible in the subchamber formed by the rotor and the housing;

wherein the slide block means comprises a guide slot in the housing and a slide block slidable engaged in the guide slot, the slide block having an end with a surface configuration means for conforming to the interior configuration of the housing chamber when extended and expanding the opening of the gas intake port when retracted.

2. The rotary compressor of claim 1 wherein the slide block means includes an additional rack on the slide block, a pinion rotatably mounted in the housing in engagement with the rack on the slideblock, and control means for rotating the pinion and displacing the slideblock in response to compression requirements for the compressor.

3. A rotary compressor comprising:

a housing forming an epitrochoidal chamber having a central axis with the housing having a circular external gear concentric to the central axis;

a multilobed rotor having an internal ring gear, the rotor eccentrically rotatable in the housing;

a drive shaft connected to the rotor for eccentrically rotating the rotor in the epitrochoidal chamber with the ring gear of the rotor engaging the circular gear of the housing wherein the rotor divides the chamber into multiple subchambers for compression of gas as the rotor rotates; and, at least one gas intake port having an opening to the chamber and at least one gas outlet port for gas discharge from the compressor, wherein the gas outlet port includes an automatic plunger valve having a spring biased slide piston and a guide sleeve in which the slide piston slides, the spring biased slide piston including a compression spring arranged in the plunger valve, wherein the slide piston is biased in a closed position by the compression spring, the plunger valve having additional pressure biasing means for biasing the piston to a closed position using back pressure from discharged gas and for biasing the piston to an open position by compressed gas pressure in the compressor, wherein the guide sleeve and slide piston have trapped gas chamber means for dampening the displacement of the slide piston to the closed position on discharge of compressed gas through the plunger valve, and wherein the compression spring provides a bias force on compression and the plunger valve has spring adjustment means for adjusting the bias force of the compression spring, and wherein the guide sleeve and slide piston form a trapped gas, buffer chamber between the piston and the guide sleeve, the buffer chamber having a relief passage that closes proximate the closing of the slide piston when the slide piston slides to a closed position trapping gas in the buffer chamber.

4. The rotary compressor of claim 3 wherein the compression spring provides a bias force on compression and the plunger valve has spring adjustment means for adjusting the bias force of the compression spring.

* * * * *